US012793917B2

(12) United States Patent
Mitsunabe et al.

(10) Patent No.: US 12,793,917 B2
(45) Date of Patent: Nov. 10, 2026

(54) ELECTRICAL CIRCUIT SWITCHING DEVICE

(71) Applicant: Daicel Corporation, Osaka (JP)

(72) Inventors: Atsushi Mitsunabe, Tokyo (JP); Tomohiro Tsuda, Tokyo (JP); Masahiro Tsuruta, Tokyo (JP); Tsuneki Konishi, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 269 days.

(21) Appl. No.: 18/835,757

(22) PCT Filed: Feb. 10, 2022

(86) PCT No.: PCT/JP2022/005456

§ 371 (c)(1),
(2) Date: Aug. 5, 2024

(87) PCT Pub. No.: WO2023/152907

PCT Pub. Date: Aug. 17, 2023

(65) Prior Publication Data

US 2025/0140498 A1 May 1, 2025

(51) Int. Cl.
*H01H 39/00* (2006.01)

(52) U.S. Cl.
CPC ..... *H01H 39/004* (2013.01); *H01H 2223/008* (2013.01)

(58) Field of Classification Search
CPC .......... H01H 39/006; H01H 9/04; H01H 9/30; H01H 2039/008; H01H 39/004; H01H 2223/008; H01H 39/00
See application file for complete search history.

(56) References Cited

U.S. PATENT DOCUMENTS 3,803,374 A * 4/1974 Delgendre .......... H01H 39/004 200/61.19
6,979,021 B2 * 12/2005 Young .................... F42B 3/103 280/741

(Continued)

FOREIGN PATENT DOCUMENTS

CN 118696393 A * 9/2024 .......... H01H 39/006
WO 2016169612 A1 10/2016
WO 2020164871 A1 8/2020

OTHER PUBLICATIONS

International Search Report and Written Opinion mailed on Apr. 26, 2022, received for PCT Application PCT/JP2022/005456, filed on Feb. 10, 2022, 13 pages including English Translation.

(Continued)

*Primary Examiner* — Ahmed M Saeed
(74) *Attorney, Agent, or Firm* — XSENSUS LLP

(57) ABSTRACT

An electrical circuit switching device includes a discharge chamber in which a combustion gas from the igniter is discharged when the igniter is actuated; a casing having conductivity and defining at least a part of the discharge chamber; and a pair of first conductor pieces arranged outside the discharge chamber in a state of being separated from each other, each of the pair of first conductor pieces forming a part of the first electrical circuit, in which before actuation of the igniter, at least one of the pair of first conductor pieces and the casing are in a non-contact state with each other and thus the first electrical circuit is in a disconnection state, and when the igniter is actuated, the casing is deformed and thus expands to an outside of the discharge chamber by energy of a combustion gas generated by actuation of the igniter.

13 Claims, 9 Drawing Sheets

(56) References Cited

U.S. PATENT DOCUMENTS

| | | | | |
|---|---|---|---|---|
| 7,498,923 | B2 * | 3/2009 | Iversen ................ | H01H 39/006 337/296 |
| 2004/0221638 | A1 * | 11/2004 | Brede .................. | B23D 15/145 60/632 |
| 2006/0049027 | A1 | 3/2006 | Iversen | |
| 2015/0248979 | A1 | 9/2015 | Parks et al. | |

OTHER PUBLICATIONS

Supplementary European Search Report mailed Nov. 6, 2025, in European Application No. 22925928.8, 4 pages.

* cited by examiner

ELECTRICAL CIRCUIT SWITCHING DEVICE

CROSS-REFERENCE TO RELATED APPLICATION

The present application is based on PCT filing PCT/JP2022/005456, filed Feb. 10, 2022, the entire contents of which are incorporated herein by reference.

TECHNICAL FIELD

The present invention relates to an electrical circuit switching device.

BACKGROUND ART

Electrical equipment may be provided with a relay that is provided in the electrical equipment (or an electrical facility) and protects the electrical equipment by switching a specific electrical circuit from a disconnection state (interruption state) to a conduction state when an abnormality occurs in the electrical equipment. As a relay, an electromagnetic relay that switches opening and closing of an electrical circuit using an electromagnet is known. However, in the known electromagnetic relay, it takes time to switch to the conduction state, and therefore there is a problem that electrical equipment fails due to an influence of an overcurrent, for example.

CITATION LIST

Patent Document

Patent Document 1: US 2015/248979 A
Patent Document 2: WO 2016/169612
Patent Document 3: WO 2020/164871

SUMMARY OF INVENTION

Technical Problem

A technology of the present disclosure is to provide a technology capable of shortening a time required for switching in an electrical circuit switching device for switching a predetermined electrical circuit from a disconnection state to a conduction state.

Solution to Problem

In order to solve the above problem, the electrical circuit switching device of the present disclosure adopts the following configuration. That is, the technology of the present disclosure is an electrical circuit switching device for switching a predetermined first electrical circuit from a disconnection state to a conduction state, the electrical circuit switching device including a housing; an igniter provided in the housing; a discharge chamber in which a combustion gas from the igniter is discharged when the igniter is actuated;

a casing having conductivity and defining at least a part of the discharge chamber; and a pair of first conductor pieces arranged outside the discharge chamber in a state of being separated from each other, each of the pair of first conductor pieces forming a part of the first electrical circuit, in which before actuation of the igniter, at least one of the pair of first conductor pieces and the casing are in a non-contact state with each other and thus the first electrical circuit is in a disconnection state, and when the igniter is actuated, the casing is deformed and thus expands to an outside of the discharge chamber by energy of a combustion gas generated by actuation of the igniter, the casing and each of the pair of first conductor pieces are brought into a state of being in contact with each other, and thus the first electrical circuit is brought into a conduction state.

The electrical circuit switching device according to the present disclosure adopts a configuration in which a first electrical circuit is switched from a disconnection state to a conduction state using the energy of a combustion gas generated by actuation of an igniter, that is, the first electrical circuit is switched from the disconnection state to the conduction state by pyroelectric driving, and therefore, it is possible to shorten the time required for switching as compared with the known electromagnetic relay. This can quickly protect the electrical equipment in which the electrical circuit switching device is installed and avoid failure. By adopting a configuration in which the casing is expansively deformed to bring the first electrical circuit into the conduction state, the electrical circuit switching device can further shorten the time for switching the first electrical circuit.

The electrical circuit switching device according to the present disclosure may be configured in which, the casing includes a tubular conductor portion formed in a tubular shape, the pair of first conductor pieces are disposed outside the tubular conductor portion in a manner that each of the pair of first conductor pieces faces an outer circumferential surface of the tubular conductor portion, and when the igniter is actuated, the tubular conductor portion is deformed and thus widened by energy generated by actuation of the igniter, and thus the tubular conductor portion and each of the pair of first conductor pieces are brought into a state of being in contact with each other.

The electrical circuit switching device according to the present disclosure may further include a projectile disposed between the igniter in the discharge chamber and the tubular conductor portion in a manner that the projectile receives a pressure of a combustion gas discharged from the igniter, in which when the igniter is actuated, the projectile moves along the tubular conductor portion while pushing and widening the tubular conductor portion by pressure of the combustion gas, and thus the tubular conductor portion and each of the pair of first conductor pieces are brought into a state of being in contact with each other.

In the electrical circuit switching device according to the present disclosure, the pair of first conductor pieces are disposed in a manner that the pair of first conductor pieces are positioned on opposite sides to each other across the tubular conductor portion, and a width of the projectile is larger than a width of an inner region of the tubular conductor portion in an array direction of the pair of first conductor pieces.

The electrical circuit switching device according to the present disclosure may be configured in which, the casing further includes a lid wall portion closing an end part on a destination side of the projectile of both end parts of the tubular conductor portion, and the projectile moving along the tubular conductor portion when the igniter is actuated is received by the lid wall portion, and thus a state in which the tubular conductor portion is pushed and widened is maintained.

In the electrical circuit switching device according to the present disclosure, the pair of first conductor pieces are disposed in a manner that the pair of first conductor pieces are positioned on opposite sides to each other across the tubular conductor portion, a slit is formed in the casing, and the slit includes a first region extending in a direction orthogonal to an array direction of the pair of first conductor pieces over an entirety of the lid wall portion, and a second region extending along the tubular conductor portion from both ends of the first region.

The electrical circuit switching device according to the present disclosure may further include a pair of second conductor pieces arranged in a state of being separated from each other, each of the pair of second conductor pieces forming a part of a predetermined second electrical circuit, in which the projectile has conductivity, before actuation of the igniter, the pair of second conductor pieces are electrically connected via the projectile and thus the second electrical circuit is in a conduction state, and when the igniter is actuated, the projectile is moved by a pressure of the combustion gas, and electrical connection between the pair of second conductor pieces via the projectile is disconnected, and thus the second electrical circuit is brought into a disconnection state.

The electrical circuit switching device according to the present disclosure may be configured in which, the casing is disposed in a manner that the casing receives a pressure of a combustion gas discharged from the igniter, and when the igniter is actuated, the casing is deformed and thus expands to an outside of the discharge chamber by the pressure of the combustion gas, and thus the casing and each of the pair of first conductor pieces are brought into a state of being in contact with each other.

In the electrical circuit switching device according to the present disclosure, the casing is made of a metal.

Advantageous Effects of Invention

According to the electrical circuit switching device according to the present disclosure, it is possible to shorten the time required to switch a predetermined electrical circuit from the disconnection state to the conduction state.

DESCRIPTION OF EMBODIMENTS

Hereinafter, an electrical circuit switching device according to an embodiment of the present disclosure will be described with reference to the drawings. Note that each of configurations, combinations thereof, and the like in the embodiments is an example, and various additions, omissions, substitutions, and other changes of the configurations may be made as appropriate without departing from the spirit of the present disclosure. The present disclosure is not limited by the embodiments, but only limited by the claims.

First Embodiment

The electrical circuit switching device according to the first embodiment is installed in electrical equipment (or an electrical facility), and protects the electrical equipment by urgently switching a predetermined electrical circuit (first electrical circuit) from a state in which the electrical circuit is interrupted (hereinafter, also called a disconnection state) to a state in which the electrical circuit is conducted (hereinafter, also called a conduction state) when an abnormality occurs in the electrical equipment that is an installation target. Note that "conduction" means that the electrical circuit is electrically connected and a current can flow, and "disconnection" means that the electrical circuit is not electrically connected and a current cannot flow.

The electrical circuit switching device according to the first embodiment prevents a failure due to an overcurrent or the like by switching the first electrical circuit, which is a predetermined electrical circuit, from a disconnection state to a conduction state, for example, at a time of an abnormality in an electrical circuit included in an automobile, a household electrical appliance, a photovoltaic system, or the like, or a system including a battery (e.g., lithium-ion battery) of the electrical circuit. Note that the configuration and application of the first electrical circuit in the present disclosure are not particularly limited. For example, the first electrical circuit may be configured as a short circuit that intentionally short-circuits a current by switching to a conduction state for the purpose of releasing charge accumulated in a circuit or a component that is a protection target. The first electrical circuit may be configured in a manner that a failed site is bypassed by switching the first electrical circuit to a conduction state in a case where any of circuits constituting an electrical facility, such as a semiconductor element and a cell of a battery, fails.

Overall Configuration

Figure 1:
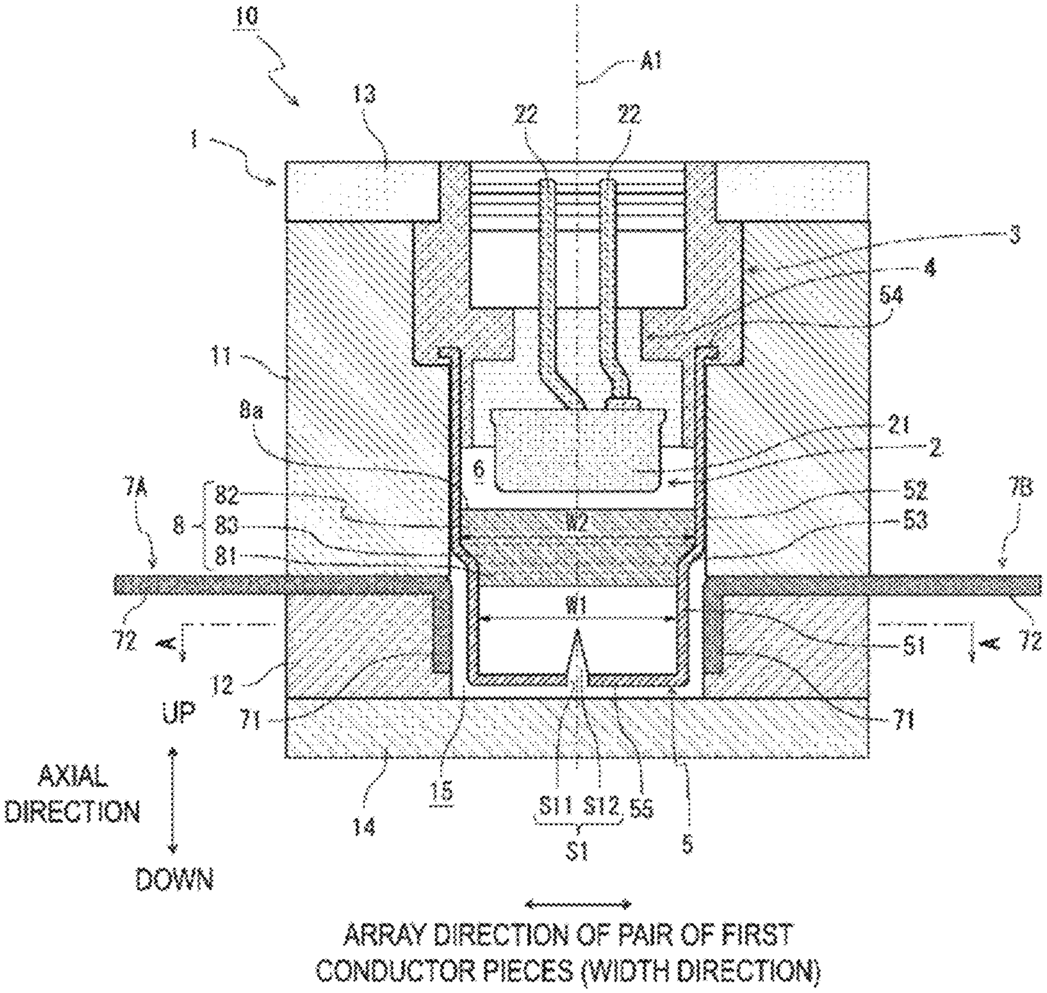
FIG. 1 is a longitudinal cross-sectional view for explaining a state before actuation of an electrical circuit switching device (hereinafter, simply called a "switching device") according to an embodiment.
Figure 2:
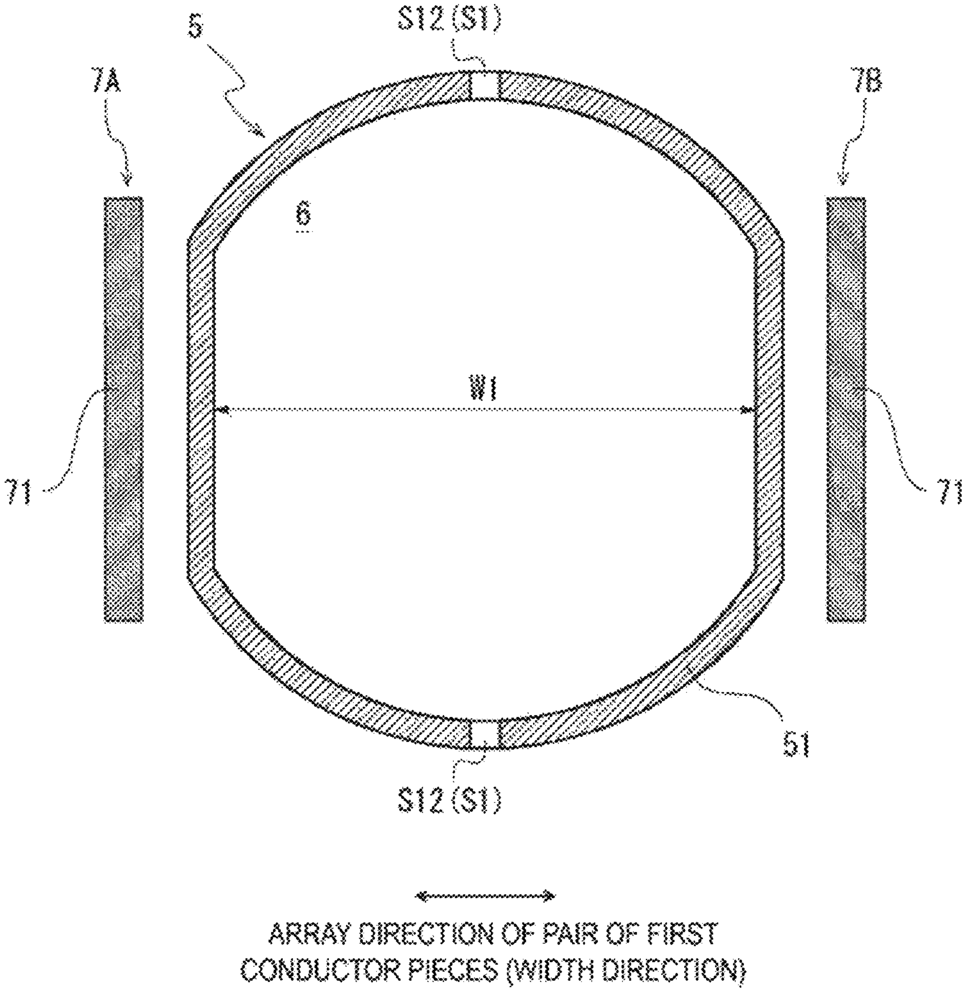
FIG. 2 is a transverse cross-sectional view of the switching device taken along line A-A in FIG. 1.

FIG. 1 is a longitudinal cross-sectional view for explaining a state before actuation of an electrical circuit switching device (hereinafter, also simply called a "switching device") 10 according to the first embodiment. FIG. 1 illustrates a cross section along a center axis A1 of a casing indicated by reference sign 5. FIG. 2 is a transverse cross-sectional view of the switching device 10 taken along line A-A in FIG. 1. Hereinafter, a direction along the center axis A1 of the casing 5 (i.e., the axial direction of the casing 5) is an "up-down direction" of the switching device 10, a side of an upper plate indicated by reference sign 13 is an "upper side" in the up-down direction, and a side of a lower plate indicated by reference sign 14 is called a "lower side" in the up-down direction. A direction orthogonal to the axial direction of the casing 5 is called a "width direction" of the switching device 10. Here, as illustrated in FIG. 1, in the switching device 10, a pair of conductor pieces indicated by reference signs 7A and 7B are arranged on both sides in the width direction across the casing 5. Hereinafter, the direction (width direction) which is orthogonal to the axial direction of the casing 5 and in which the pair of first conductor pieces 7A and 7B are arranged is called an "array direction of the pair of first conductor pieces 7A and 7B". In the present specification, a cross section along the up-down direction of the switching device 10 is called a "longitudinal cross section" of the switching device 10, and a cross section orthogonal to the up-down direction is called a "transverse cross section" of the switching device 10.

As illustrated in FIG. 1, the switching device 10 according to the first embodiment includes a housing 1, an igniter 2, a collar member 3, a holding member 4, the casing 5, a discharge chamber 6, the pair of first conductor pieces 7A and 7B, and a projectile 8.

Housing

As illustrated in FIG. 1, the housing 1 includes an upper housing 11, a lower housing 12, an upper plate 13, and a lower plate 14. The upper housing 11 and the lower housing 12 each have a substantially prismatic outer shape extending in the up-down direction, for example. The lower housing 12 is coupled to the lower end part of the upper housing 11 across the pair of first conductor pieces 7A and 7B. The upper housing 11 and the lower housing 12 can be formed of an insulating member such as synthetic resin, for example. Examples of the material of the upper housing 11 and the lower housing 12 include polycarbonate. The upper plate 13 and the lower plate 14 each have a substantially plate-shaped outer shape extending in the width direction, for example. The upper plate 13 is coupled to the upper end of the upper housing 11, and the lower plate 14 is coupled to the lower end of the lower housing 12. Examples of the material of the upper plate 13 and the lower plate 14 include a steel material such as SUS. As illustrated in FIG. 1, holes penetrate the upper plate 13, the upper housing 11, and the lower housing 12 in the up-down direction, and these holes are continuous, thereby forming an accommodation portion 15 extending in the up-down direction from the upper plate 13 to the lower housing 12 in the housing 1. Note that the shape and material of the housing 1 are not limited to those described above.

Igniter

As illustrated in FIG. 1, the igniter 2 is provided in the housing 1 in a state of being disposed in the accommodation portion 15. The igniter 2 is an electric igniter including an ignition portion 21 and a pair of conductive pins 22 and 22. An ignition charge (not illustrated) is accommodated inside the ignition portion 21. The material of the ignition charge is not particularly limited, but for example, zirconium-potassium perchlorate (ZPP), zirconium-tungsten-potassium perchlorate (ZWPP), titanium hydride-potassium perchlorate (THPP), lead tricinate, or the like may be adopted. The pair of conductive pins 22 and 22 extend upward from the ignition portion 21. A connector (not illustrated) of an external power source is connected to the upper end parts of the pair of conductive pins 22 and 22.

The igniter 2 is actuated by power supplied to each of the conductive pins 22 and 22 via the connector of the external power source. In actuation of the igniter 2, when an operating current for igniting the ignition charge is supplied from the power source to the conductive pins 22, a bridge wire (not illustrated) of the ignition portion 21 generates heat, whereby the ignition charge accommodated in the ignition portion 21 is ignited and a combustion gas is generated. Then, when the pressure inside the ignition portion 21 increases with the combustion of the ignition charge, the ignition portion 21 is ruptured, whereby the combustion gas is discharged from the igniter 2.

Collar

As illustrated in FIG. 1, the collar member 3 has a substantially tubular shape, and is disposed in the accommodation portion 15 and thus surrounds the igniter 2. The collar member 3 is formed of a metal material, for example. However, the material of the collar member 3 is not limited to a metal material. The collar member 3 is fixed to the housing 1 by being fitted to a wall surface of the accommodation portion 15. Note that the collar member 3 is not an essential component in the technology of the present disclosure. For example, the collar member 3 may be formed as a member integrated with the housing 1 (as one member).

Holding Part

As illustrated in FIG. 1, by being interposed between the igniter 2 and the collar member 3, the holding member 4 fixes the igniter 2 to the collar member 3. Due to this, the igniter 2 is fixed to the housing 1. The holding member 4 is formed of a resin material, for example. However, the material of the holding member 4 is not limited to the resin material. The holding member 4 covers the igniter 2 and thus a bottom surface (lower surface) of the ignition portion 21 of the igniter 2 is exposed to the discharge chamber 6 (described later), which is a part of the accommodation portion 15, and the upper end parts of the pair of conductive pins 22 and 22 are exposed to a region inside the collar member 3 in the accommodation portion 15. Since the pair of conductive pins 22 and 22 are exposed to the region inside the collar member 3, a connector (not illustrated) for supplying power from an external power source can be connected to the pair of conductive pins 22 and 22. Note that the holding member 4 is not an essential component in the technology of the present disclosure.

Casing

As illustrated in FIG. 1, the casing 5 is a substantially bottomed tubular member extending in the up-down direction and having a lower end closed and an upper end open, and is hollow inside. The casing 5 is disposed in the accommodation portion 15 in a manner that the casing 5 surrounds the ignition portion 21 in the igniter 2, thereby defining, inside the accommodation portion 15, the discharge chamber 6, which is a space in which the combustion gas from the igniter 2 is discharged when the igniter 2 is actuated. Note that the casing 5 may define at least a part of the discharge chamber 6, and the discharge chamber 6 may be defined by the housing 1 and the casing 5.

The casing 5 has conductivity. The casing 5 is made of a metal, and can be formed of copper (Cu), for example. However, the casing 5 may be formed of a metal other than copper, or may be formed of an alloy of copper and another metal.

As illustrated in FIG. 1, the casing 5 includes a first tubular portion 51, a second tubular portion 52, a connection portion 53, a flange portion 54, and a lid wall portion 55. The first tubular portion 51 and the second tubular portion 52 are formed in a tubular shape extending in the up-down direction, and the first tubular portion 51 is disposed on a lower side relative to the second tubular portion 52. In the array direction of the pair of first conductor pieces 7A and 7B, the first tubular portion 51 is smaller in width than the second tubular portion 52. As illustrated in FIG. 2, in the first tubular portion 51, portions positioned on both sides in the array direction of the pair of first conductor pieces 7A and 7B are formed in a flat shape in a manner that the portions are orthogonal to the array direction, and other portions are formed in an arc shape. The first tubular portion 51 is an example of the "tubular conductor portion" in the present disclosure. The connection portion 53 is an annular portion connecting the upper end part of the first tubular portion 51 and the lower end part of the second tubular portion 52, and is inclined and thus gradually widens toward the upper side. The casing 5 is formed in a stepped tubular shape by the first tubular portion 51, the second tubular portion 52, and the connection portion 53. The flange portion 54 extends outward from the upper end part of the second tubular portion 52. The lid wall portion 55 closes the lower end part of the first tubular portion 51.

The casing 5 is fixed to the housing 1 by fitting the second tubular portion 52 to the wall surface of the accommodation portion 15 and engaging the flange portion 54 with the collar member 3. In the first embodiment, the first tubular portion 51, the second tubular portion 52, the connection portion 53, and the lid wall portion 55 define the discharge chamber 6 having a substantially circular columnar shape extending in the up-down direction. Here, W1 in FIG. 1 represents a width in the array direction of the pair of first conductor pieces 7A and 7B of a region inside (inner region of) the first tubular portion 51 in the discharge chamber 6.

Figure 3:
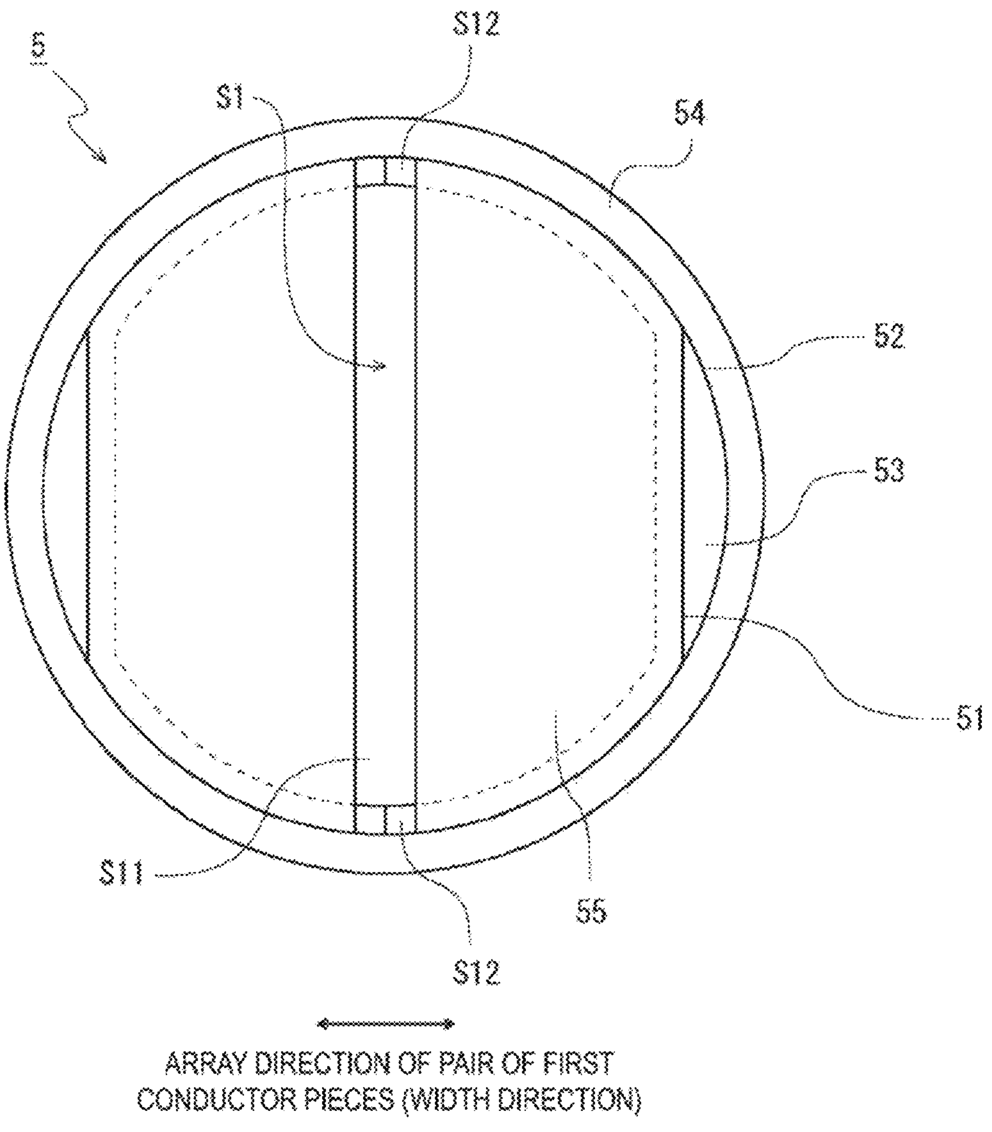
FIG. 3 is a bottom view of a casing according to a first embodiment.

FIG. 3 is a bottom view of the casing 5 according to the first embodiment. FIG. 3 illustrates a state in which the casing 5 before the igniter 2 is actuated is viewed from below. As illustrated in FIGS. 1 to 3, a slit indicated by reference sign S1 is formed in the casing 5 according to the first embodiment. The slit S1 includes a first region S11 formed in the lid wall portion 55 and a second region S12 formed in the first tubular portion 51. As illustrated in FIG. 3, the first region S11 extends in a direction orthogonal to the array direction of the pair of first conductor pieces 7A and 7B over the entirety of the lid wall portion 55. The second region S12 extends upward along the first tubular portion 51 from both ends of the first region S11 to the middle of the first tubular portion 51. As illustrated in FIGS. 2 and 3, the second regions S12 are formed one by one at portions positioned on both sides in the direction orthogonal to the array direction of the pair of first conductor pieces 7A and 7B, in the first tubular portion 51. As illustrated in FIG. 1, the second region S12 is formed in a tapered shape and thus the width becomes narrower upward.

Note that the shape of the casing 5 is not limited to that described above. The shape of the casing 5 may be, for example, a cylindrical tubular shape or a rectangular tubular shape. In the technology of the present disclosure, the second tubular portion 52, the connection portion 53, the flange portion 54, the lid wall portion 55, and the slit S1 are not essential components.

Pair of First Conductor Pieces

The pair of first conductor pieces 7A and 7B are conductive metal bodies that constitute a part of the constituent elements of the switching device 10, and each of the pair of first conductor pieces 7A and 7B forms a part of the predetermined first electrical circuit in electrical equipment when the switching device 10 is installed in the electrical equipment that is an installation target. The pair of first conductor pieces 7A and 7B are sometimes called bus bars. The first electrical circuit is formed of the pair of first conductor pieces 7A and 7B and a circuit component included in the electrical equipment.

As illustrated in FIG. 1, the pair of first conductor pieces 7A and 7B are arranged outside the discharge chamber 6 in a state of being separated from each other. More specifically, the pair of first conductor pieces 7A and 7B are disposed outside the first tubular portion 51 in a manner that they face the outer circumferential surface of the first tubular portion 51 of the casing 5. As illustrated in FIGS. 1 and 2, in the first embodiment, the pair of first conductor pieces 7A and 7B are positioned on opposite sides to each other across the first tubular portion 51, and the pair of first conductor pieces 7A and 7B and the first tubular portion 51 are aligned. However, in the present disclosure, the arrangement of the pair of first conductor pieces is not limited to that described above. The pair of first conductor pieces may be disposed outside the discharge chamber.

Each of the pair of first conductor pieces 7A and 7B includes a contact piece 71 and a connection piece 72. The contact piece 71 extends in the up-down direction in a manner that it is orthogonal to the array direction. The connection piece 72 extends to the side away from the first tubular portion 51 along the array direction from the upper end part of the contact piece 71. Each of the pair of first conductor pieces 7A and 7B is held by the housing 1 in a state where the contact piece 71 is disposed in the accommodation portion 15 and the connection piece 72 is sandwiched from above and below by the upper housing 11 and the lower housing 12. In the pair of first conductor pieces 7A and 7B, the contact piece 71 faces the outer circumferential surface of the first tubular portion 51, and the end part of the connection piece 72 protrudes to the outside of the housing 1. Another conductor (e.g., a lead wire) is connected in the first electrical circuit to a portion protruding to the outside of the housing 1 of the connection piece 72.

The pair of first conductor pieces 7A and 7B can be formed of a metal such as copper (Cu), for example. However, the pair of first conductor pieces 7A and 7B may be formed of a metal other than copper, or may be formed of an alloy of copper and another metal. Note that examples of a metal other than copper that can be contained in the pair of first conductor pieces 7A and 7B include manganese (Mn), nickel (Ni), and platinum (Pt).

Projectile

As illustrated in FIG. 1, the projectile 8 is formed in a stepped substantially circular columnar shape extending in the up-down direction, and is fitted into the casing 5. The projectile 8 is disposed between the igniter 2 and the first tubular portion 51 in the discharge chamber 6 in a manner that the projectile 8 receives the pressure of the combustion gas discharged from the igniter 2.

The projectile 8 includes a fitting portion 81, a widened portion 82, and an inclination portion 83. The fitting portion 81 has a cross-sectional shape corresponding to the cross-sectional shape of the inner region of the first tubular portion 51 of the casing 5, and is fitted to the first tubular portion 51 before actuation of the igniter 2. The widened portion 82 is formed on an upper side relative to the fitting portion 81, has a cross-sectional shape corresponding to the cross-sectional shape of the inner region of the second tubular portion 52 of the casing 5, and is fitted to the second tubular portion 52 before actuation of the igniter 2. In the array direction of the pair of first conductor pieces 7A and 7B, the widened portion 82 is larger in width than the fitting portion 81. The inclination portion 83 is a portion connecting the fitting portion 81 and the widened portion 82, has a cross-sectional shape corresponding to the cross-sectional shape of the inner region of the connection portion 53 of the casing 5, and is fitted to the connection portion 53 before actuation of the igniter 2. The inclination portion 83 is inclined and thus gradually widens upward. The upper end surface of the projectile 8 faces the ignition portion 21 of the igniter 2. Therefore, the upper end surface of the projectile 8 is formed as a pressure receiving surface 8*a* that receives the energy (pressure of the combustion gas discharged from the igniter 2) generated by actuation of the igniter 2. When the igniter 2 is actuated, the projectile 8 moves downward inside the first tubular portion 51 along the extending direction of the first tubular portion by the pressure of the combustion gas received by the pressure receiving surface 8*a*. Hereinafter, a "downward direction" may be called a "moving direction of the projectile 8".

The projectile 8 has conductivity. The projectile 8 can be formed of a metal such as copper (Cu), for example. However, the projectile 8 may be formed of a metal other than copper, or may be formed of an alloy of copper and another metal. In the first embodiment, the projectile 8 need not have conductivity, and may be formed of an insulating member such as synthetic resin, for example.

Here, W2 in FIG. 1 represents the width in the array direction of the pair of first conductor pieces 7A and 7B of the widened portion 82 of the projectile 8. That is, the width W2 is the maximum width of the projectile 8 in the array direction. At this time, in the present embodiment, the relationship between the width W1 of the inner region of the first tubular portion 51 and the width W2 of the widened portion 82 is W1<W2. Therefore, before actuation of the igniter 2, the widened portion 82 cannot enter the inside of the first tubular portion 51, and the projectile 8 is restricted from moving downward.

Operation

Next, details of the operation when the switching device 10 is actuated to switch the first electrical circuit from the disconnection state to the conduction state will be described. As described above, FIG. 1 illustrates a state before actuation (hereinafter, also called a "pre-actuation initial state") of the switching device 10. As illustrated in FIGS. 1 and 2, in the pre-actuation initial state, a gap is formed between the first tubular portion 51 of the casing 5 and each of the pair of first conductor pieces 7A and 7B. More specifically, the first tubular portion 51 of the casing 5 and each of the pair of first conductor pieces 7A and 7B are separated from each other in the array direction of the pair of first conductor pieces 7A and 7B. This brings each of the pair of first conductor pieces 7A and 7B and the casing 5 to be in a non-contact state with each other. Therefore, in the pre-actuation initial state, the first electrical circuit is in a disconnection state. Note that in the pre-actuation initial state, the casing 5 and at least one of the pair of first conductor pieces 7A and 7B need to be in a non-contact state with each other, whereby the first electrical circuit is brought into a disconnection state in the pre-actuation initial state. As illustrated in FIG. 1, in the pre-actuation initial state, the widened portion 82 of the projectile 8 is positioned on an upper side (i.e., the near side in the moving direction of the projectile) relative to the first tubular portion 51 of the casing 5. Furthermore, as described above, before actuation of the igniter 2, the projectile 8 is restricted from moving downward. Therefore, in the pre-actuation initial state, a non-contact state between at least one of the pair of first conductor pieces 7A and 7B and the casing 5 is maintained, and eventually, a disconnection state of the first electrical circuit is maintained.

Here, the switching device 10 according to the first embodiment further includes an abnormality detection sensor (not illustrated) that detects an abnormal state of electrical equipment (a vehicle, a power generation facility, a power storage facility, and the like) in which the switching device 10 is installed, and a control unit (not illustrated) that controls actuation of the igniter 2. The abnormality detection sensor may detect an abnormal state such as an overcurrent based on a current flowing through a circuit that is a protection target in the electric equipment, for example. Further, the abnormality detection sensor may be, for example, an impact sensor, a temperature sensor, an acceleration sensor, a vibration sensor, or the like, and may detect an abnormal state such as an accident or fire on the basis of an impact, a temperature, acceleration, or vibration in a device such as a vehicle. The control unit of the switching device 10 is a computer that can exhibit a predetermined function by executing a predetermined control program, for example. The predetermined function of the control unit may be realized by corresponding hardware. For example, when an overcurrent flows through a circuit that is a protection target of the electrical equipment in which the switching device 10 is installed, the overcurrent is detected by the abnormality detection sensor. Abnormality information regarding the detected abnormal current is passed from the abnormality detection sensor to the control unit. For example, based on the current value detected by the abnormality detection sensor, the control unit receives energization from an external power source (not illustrated) connected to the pair of conductive pins 22 and 22 of the igniter 2, and actuates the igniter 2. Here, the overcurrent may be defined by a current value exceeding a predetermined threshold set for protecting the electrical circuit that is a protection target. Note that the abnormality detection sensor and the control unit described above need not be included in the constituent elements of the switching device 10, and may be included in a device different from the switching device 10, for example. The abnormality detection sensor and the control unit are not essential components of the switching device 10.

Figure 4:
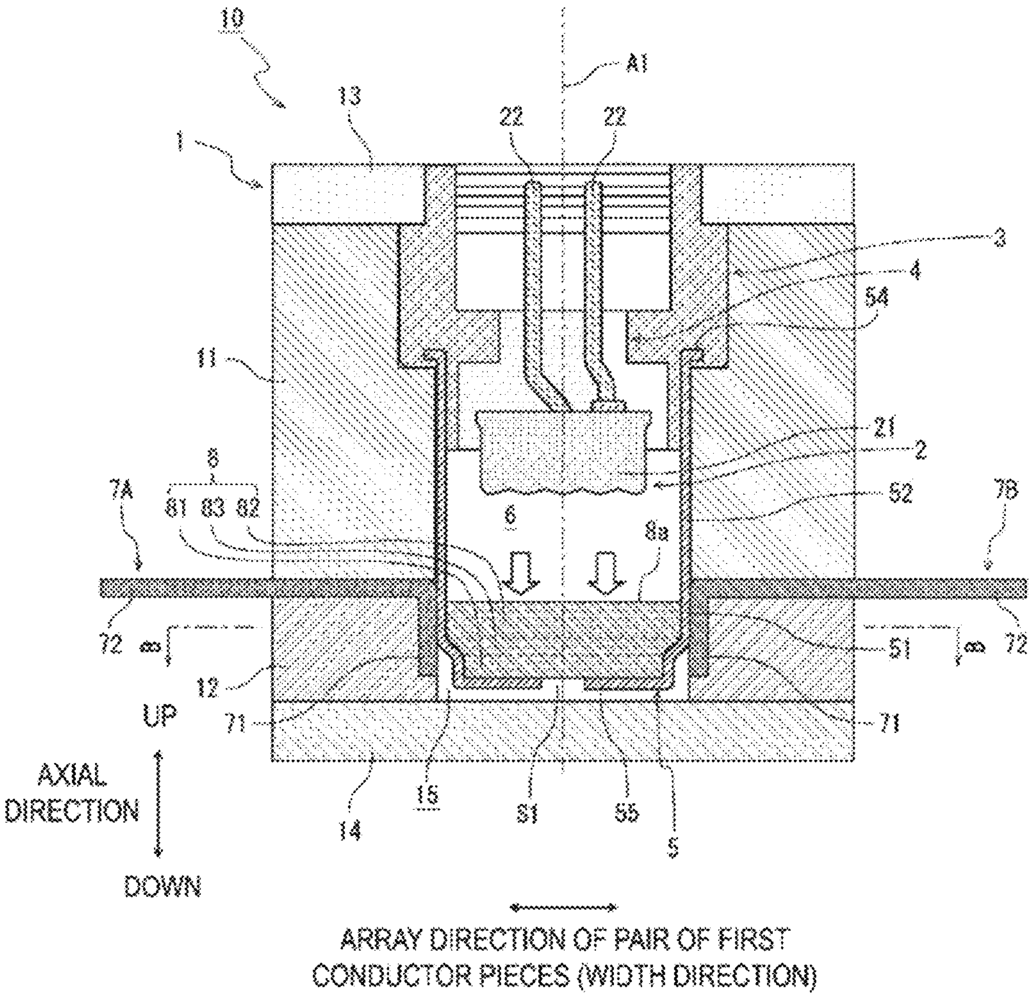
FIG. 4 is a longitudinal cross-sectional view for explaining an actuation status of a switching device according to the first embodiment.
Figure 5:
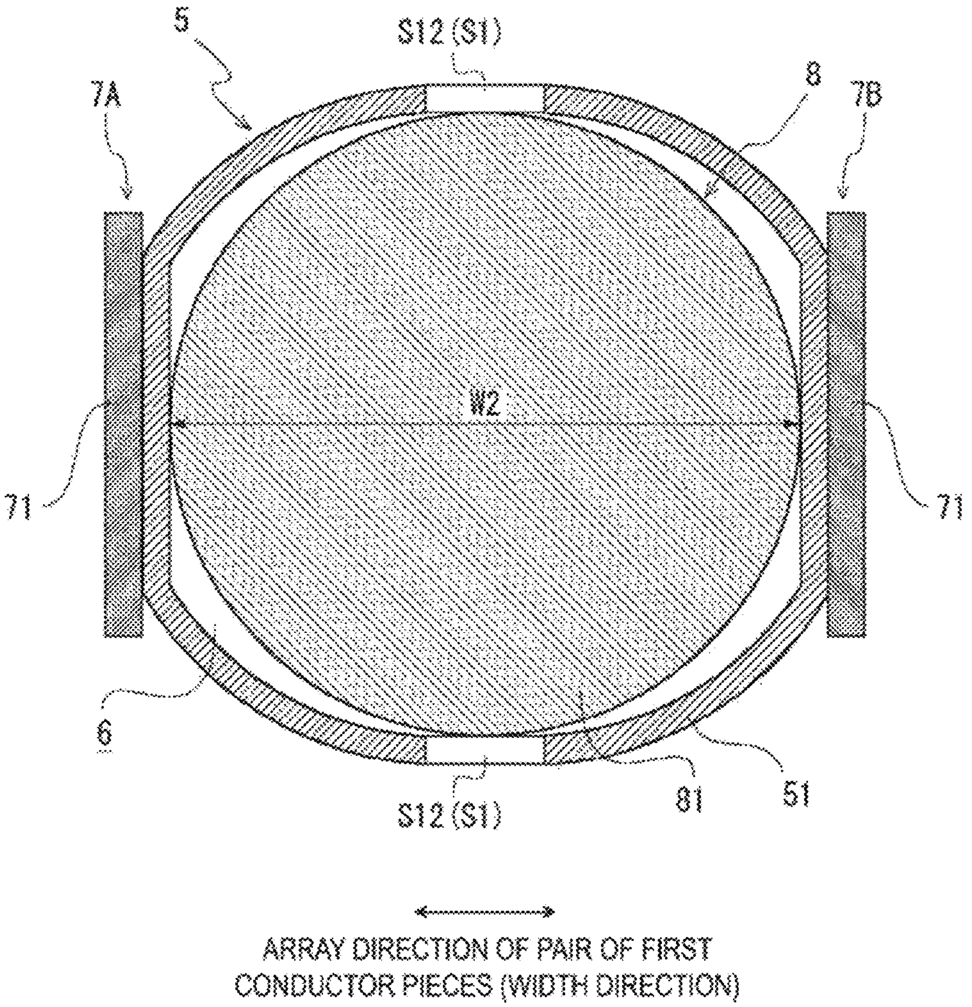
FIG. 5 is a transverse cross-sectional view of the switching device taken along line B-B in FIG. 4.

FIG. 4 is a longitudinal cross-sectional view for explaining an actuation status of the switching device 10 according to the first embodiment. FIG. 5 is a transverse cross-sectional view of the switching device 10 taken along line B-B in FIG. 4. When the igniter 2 is actuated, a combustion gas is discharged from the igniter 2 into the discharge chamber 6. Then, the projectile 8 receives, on the pressure receiving surface 8*a*, the pressure (energy) of the combustion gas generated by the actuation of the igniter 2. Due to this, the pressure of the combustion gas is converted into a propulsive force, and the projectile 8 is pushed downward vigorously. Then, as illustrated in FIG. 4, the projectile 8 moves downward inside the first tubular portion 51 along the first tubular portion (i.e., along the extending direction of the first tubular portion) by the pressure of the combustion gas received by the pressure receiving surface 8*a*.

At this time, as described above, since the relationship between the width W1 of the inner region of the first tubular portion 51 and the width W2 of the widened portion 82 is W1<W2, the projectile 8 moves downward along the first tubular portion 51 while pushing and widening the first tubular portion 51 by the widened portion 82. Due to this, the first tubular portion 51 is deformed and thus widens in the array direction of the pair of first conductor pieces 7A and 7B. Since the pair of first conductor pieces 7A and 7B are arranged on opposite sides to each other across the first tubular portion 51, the first tubular portion 51 is widened in the array direction of the pair of first conductor pieces 7A and 7B, whereby the first tubular portion 51 of the casing 5 and the contact piece 71 of each of the pair of first conductor pieces 7A and 7B are brought into a state of being in contact with each other as illustrated in FIGS. 4 and 5. Due to this, the pair of first conductor pieces 7A and 7B are electrically connected to each other via the casing 5 having conductivity. As a result, the first electrical circuit is brought into a conduction state. Note that in the switching 25 device 10, the connection portion 53 connecting the first tubular portion 51 and the second tubular portion 52 is inclined, and the inclination portion 83 connecting the fitting portion 81 and the widened portion 82 is inclined, and therefore, when the projectile 8 receives the pressure of the combustion gas, the widened portion 82 easily enters the first tubular portion 51.

In this manner, the switching device 10 according to the first embodiment causes the casing 5 to deform and thus the casing 5 expands to the outside of the discharge chamber 6 by the energy of the combustion gas generated by the actuation of the igniter 2, whereby each of the pair of first conductor pieces 7A and 7B arranged outside the discharge chamber 6 and the casing 5 can be brought into a state of being in contact with each other. As a result, the first electrical circuit can be quickly switched from the disconnection state to the conduction state. For example, in a case where the first electrical circuit is a short circuit that intentionally short-circuits a current, the first electrical circuit is brought into a conduction state, charge accumulated in the electrical circuit or a component to be protected can be passed to the first electrical circuit and released, and failure of electrical equipment due to an overcurrent can be avoided. In this manner, it is possible to quickly protect the electrical equipment that is a target in which the switching device 10 is installed.

Here, as illustrated in FIG. 4, of both end parts of the first tubular portion 51, the end part on the destination side (i.e., lower side) of the projectile 8 is closed by the lid wall portion 55. Therefore, when the igniter 2 is actuated, the projectile 8 moved along the first tubular portion 51 is received by the lid wall portion 55. This inhibits the projectile 8 from moving downward relative to the first tubular portion 51 and coming out of the first tubular portion 51. As a result, a state in which the first tubular portion 51 is pushed and widened by the projectile 8 is maintained, and a state in which the first tubular portion 51 of the casing 5 and each of the pair of first conductor pieces 7A and 7B are in contact with each other is maintained. Furthermore, the above-described slit S1 is formed in the casing 5. The first region S11 of the slit S1 extends in a direction orthogonal to the array direction of the pair of first conductor pieces 7A and 7B over the entirety of the lid wall portion 55, and the second region S12 extends along the first tubular portion 51 from each of the ends of the first region S11. Since the slit S1 is formed in the casing 5, the first tubular portion 51 is easily deformed when receiving a force that pushes and widens the first tubular portion 51 in the array direction of the pair of first conductor pieces 7A and 7B. This makes it easy for the first tubular portion 51 to deform and thus widen in the array direction of the pair of first conductor pieces 7A and 7B when the projectile 8 moves downward along the first tubular portion 51. As a result, the first electrical circuit can be more reliably switched from the disconnection state to the conduction state.

Actions and Effects

As described above, the switching device 10 according to the first embodiment includes the housing 1, the igniter 2 provided in the housing 1, the discharge chamber 6 in which a combustion gas from the igniter 2 is discharged when the igniter 2 is actuated, the casing having conductivity and defining at least a part of the discharge chamber 6, and the pair of first conductor pieces 7A and 7B arranged outside the discharge chamber 6 in a state of being separated from each other. Each of the pair of first conductor pieces 7A and 7B forms a part of the first electrical circuit. In the switching device 10 according to the first embodiment, before actuation of the igniter 2, the casing 5 and at least one of the pair of first conductor pieces 7A and 7B are in a non-contact state with each other and thus the first electrical circuit is in a disconnection state, and when the igniter 2 is actuated, the casing 5 is deformed and thus expands to the outside of the discharge chamber 6 by the energy of the combustion gas generated by actuation of the igniter 2, the casing 5 and each of the pair of first conductor pieces 7A and 7B are brought into a state of being in contact with each other, and thus the first electrical circuit is brought into a conduction state.

The electrical circuit switching device 10 according to the first embodiment adopts a configuration in which the first electrical circuit is switched from a disconnection state to a conduction state using the energy of a combustion gas generated by actuation of the igniter 2, that is, the first electrical circuit is switched from the disconnection state to the conduction state by pyroelectric drive, and therefore, it is possible to shorten the time required for switching as compared with the known electromagnetic relay. This can quickly protect the electrical equipment in which the switching device 10 is installed and avoid failure. By adopting a configuration in which the casing 5 is expansively deformed to bring the first electrical circuit into a conduction state, the switching device 10 can further shorten the time for switching the first electrical circuit and can further downsize the switching device 10.

In the switching device 10 according to the first embodiment, the pair of first conductor pieces 7A and 7B is disposed outside the first tubular portion 51 in a manner that they face the outer circumferential surface of the first tubular portion 51 of the casing 5. The switching device 10 has a configuration in which, when the igniter 2 is actuated, the first tubular portion 51 is deformed and thus widened by the energy generated by the actuation of the igniter 2, whereby the first tubular portion 51 and each of the pair of first conductor pieces 7A and 7B are brought into a state of being in contact with each other. Due to this, the first electrical circuit can be switched from the disconnection state to the conduction state. Note that in the present embodiment, the configuration in which the first tubular portion 51 having a tubular shape is widened and deformed is adopted, but the technology of the present disclosure is not limited to this. For example, the pair of first conductor pieces 7A and 7B may be arranged below the lid wall portion 55 of the casing 5, and the lid wall portion 55 and each of the pair of first conductor pieces 7A and 7B may be brought into contact with each other by pushing and extending downward the first tubular portion 51 by the energy generated by the actuation of the igniter 2, and the first electrical circuit may be brought into the conduction state. The casing according to the present disclosure need not have a tubular shape, and may have a spherical shape, for example.

The switching device 10 according to the first embodiment further includes the projectile 8 that is disposed between the igniter 2 and the first tubular portion 51 in the discharge chamber 6 in a manner that the projectile 8 receives the pressure of the combustion gas discharged from the igniter 2. The switching device 10 has a configuration in which, when the igniter 2 is actuated, the projectile 8 moves along the first tubular portion 51 while pushing and widening the first tubular portion 51 by the pressure of the combustion gas, whereby the first tubular portion 51 and each of the pair of first conductor pieces 7A and 7B are brought into a state of being in contact with each other. That is, the energy of the combustion gas generated by the actuation of the igniter 2 is converted into the propulsive force of the projectile 8, and the first tubular portion 51 is widened and deformed by the propulsive force of the projectile 8. This can largely widen and deform the first tubular portion 51. Therefore, even when the gap between the first tubular portion 51 of the casing 5 and each of the pair of first conductor pieces 7A and 7B is large in the pre-actuation initial state, the first electrical circuit can be brought into a conduction state by bringing the first tubular portion 51 into contact with each of the pair of first conductor pieces 7A and 7B. This makes it possible to ensure a large distance between the first tubular portion 51 of the casing 5 and each of the pair of first conductor pieces 7A and 7B in the pre-actuation initial state. This is advantageous when the first electrical circuit is a high-voltage circuit, for example. However, in the technology of the present disclosure, the projectile is not an essential component. The technology of the present disclosure may directly expand the casing by the pressure of the combustion gas without using a projectile, as in a modification described later.

Furthermore, in the switching device 10 according to the first embodiment, the pair of first conductor pieces 7A and 7B are arranged in a manner that they are positioned on opposite sides to each other across the first tubular portion 51, and in the array direction of the pair of first conductor pieces 7A and 7B, the width W2 of the projectile 8 is larger than the width W1 of the inner region of the first tubular portion 51. Due to this, the first tubular portion 51 can be pushed and widened by the projectile 8 when the projectile 8 moves along the first tubular portion 51.

The casing 5 of the switching device 10 according to the first embodiment includes the lid wall portion 55 closing the end part (i.e., the lower end part) on the destination side of the projectile 8 of both end parts of the first tubular portion 51. The switching device 10 has a configuration in which, when the igniter 2 is actuated, the projectile 8 moving along the first tubular portion 51 is received by the lid wall portion 55, whereby a state in which the first tubular portion 51 is pushed and widened is maintained. This can maintain, after the actuation of the igniter 2, a state in which the first tubular portion 51 of the casing 5 and the contact piece 71 of each of the pair of first conductor pieces 7A and 7B are in contact with each other, that is, the conduction state of the first electrical circuit. However, in the technology of the present disclosure, the lid wall portion 55 is not an essential component. For example, the projectile 8 may be received by the lower plate 14 in place of the lid wall portion 55.

Furthermore, in the switching device 10 according to the first embodiment, the pair of first conductor pieces 7A and 7B are arranged in a manner that they are positioned on opposite sides to each other across the first tubular portion 51, and the slit S1 is formed in the casing 5. The slit S1 includes the first region S11 extending in a direction orthogonal to the array direction of the pair of first conductor pieces 7A and 7B over the entirety of the lid wall portion 55, and the second region S12 extending along the first tubular portion 51 from each of the ends of the first region S11. This makes it easy for the first tubular portion 51 to deform and thus widen in the array direction of the pair of first conductor pieces 7A and 7B when the projectile 8 moves downward along the first tubular portion 51. As a result, the first electrical circuit can be more reliably switched from the disconnection state to the conduction state. However, in the technology of the present disclosure, the slit S1 is not an essential component.

Modification

Figure 6:
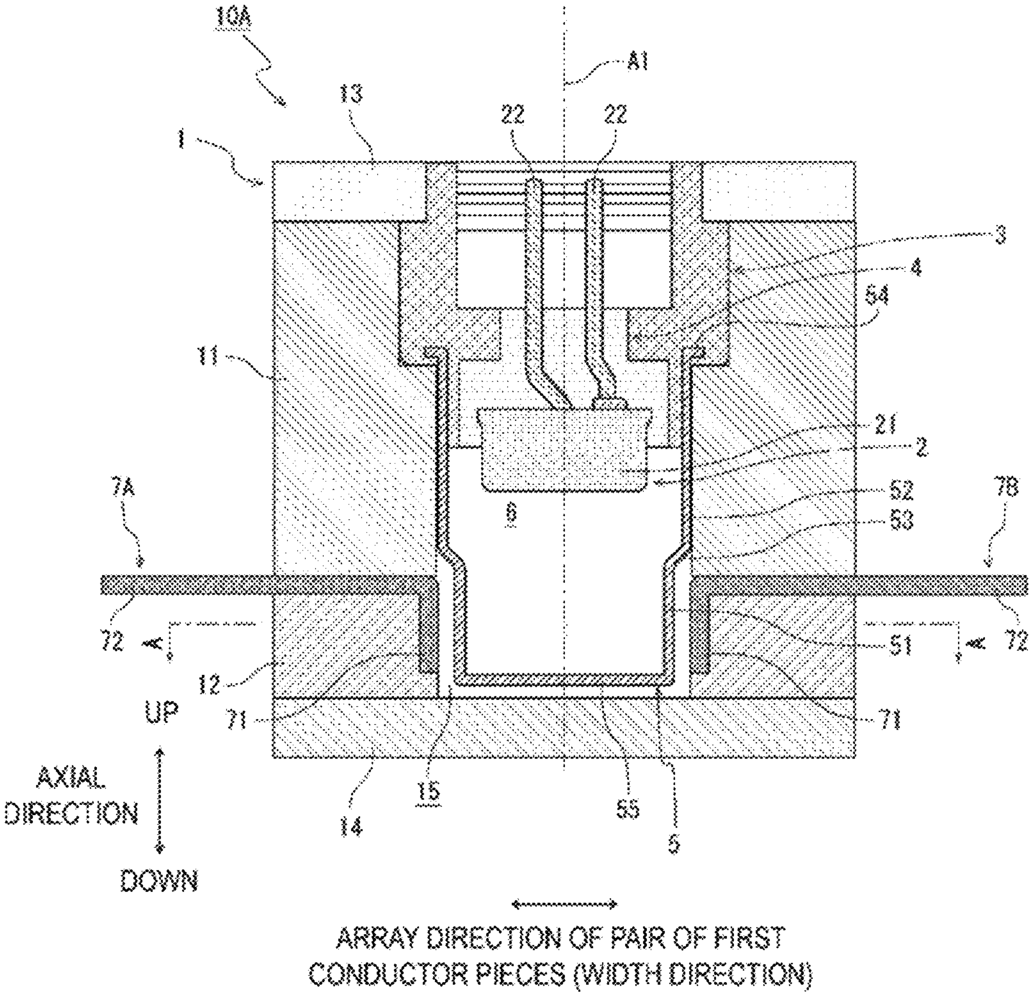
FIG. 6 is a longitudinal cross-sectional view for explaining a state before actuation of a switching device according to a modification of the first embodiment.
Figure 7:
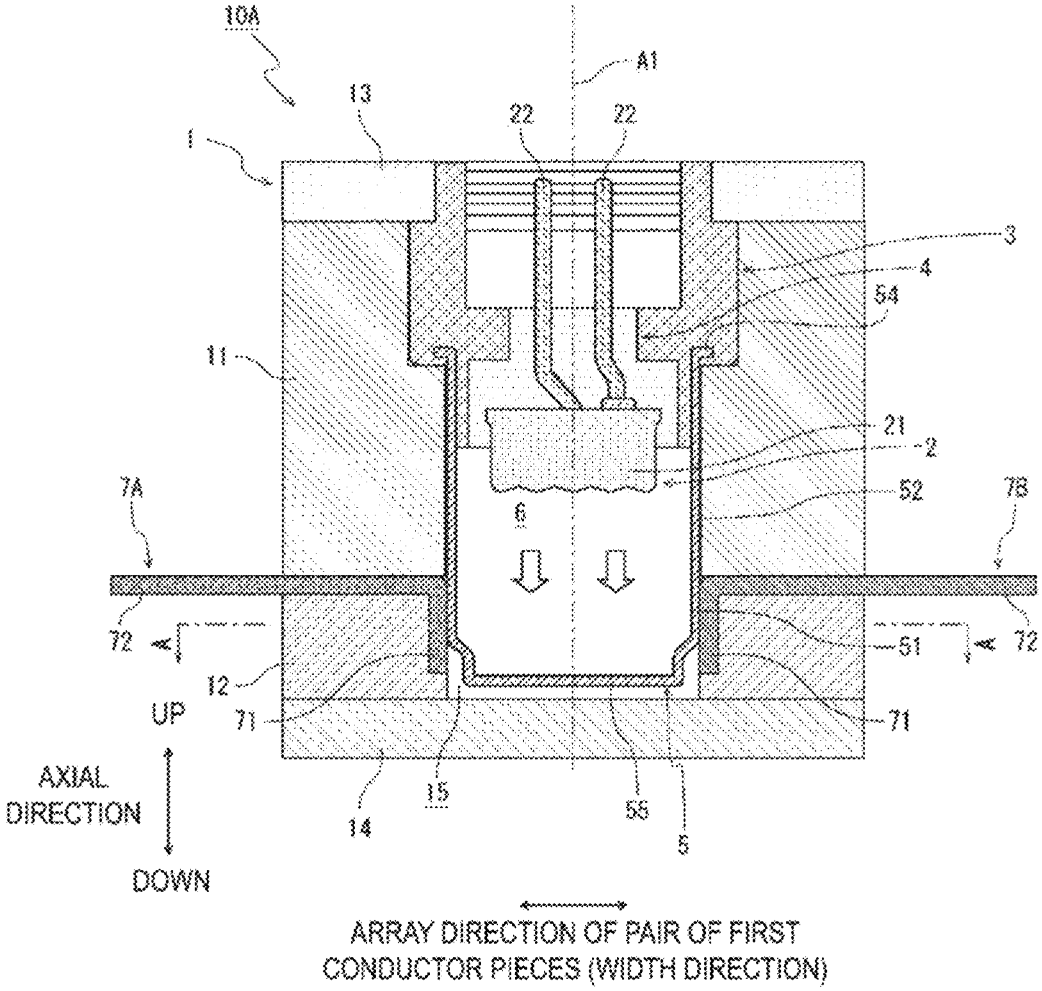
FIG. 7 is a longitudinal cross-sectional view for explaining an actuation status of the switching device according to the modification of the first embodiment.

A switching device 10A according to a modification of the first embodiment will be described below. In the description of the switching device 10A, differences from the switching device 10 will be mainly described, and points similar to those of the switching device 10 will be denoted by identical reference signs, and detailed description thereof will be omitted. FIG. 6 is a longitudinal cross-sectional view for explaining a state before actuation of the switching device 10A according to the modification of the first embodiment. FIG. 7 is a longitudinal cross-sectional view for explaining an actuation status of the switching device 10A according to the modification of the first embodiment. As illustrated in FIGS. 6 and 7, the switching device 10A according to the modification is different from the switching device 10 described above in that the projectile 8 is not included and the slit S1 of the casing 5 is not formed.

In the switching device 10A according to the modification, the casing 5 is disposed in a manner that it receives a pressure of a combustion gas discharged from the igniter 2 when the igniter 2 is actuated. As illustrated in FIG. 6, in the modification, a member such as the projectile 8 described above is not interposed between the igniter 2 and the casing 5. Therefore, the energy (pressure) of the combustion gas directly acts on an inner wall of the casing 5 (more specifically, a region defining the discharge chamber 6 of the inner wall of the casing 5).

When the igniter 2 is actuated in the switching device 10A according to the modification, the combustion gas is discharged from the igniter 2 to the discharge chamber. At this time, in the switching device 10A, since the above-described slit S1 or a hole is not formed in the casing 5, the combustion gas does not escape to the outside of the discharge chamber 6, and the internal pressure of the discharge chamber 6 rises. As a result, as illustrated in FIG. 7, the casing 5 is deformed and thus expands to the outside of the discharge chamber 6 by the pressure of the combustion gas acting on the inner wall of the casing 5. This brings the casing 5 and each of the pair of first conductor pieces 7A and 7B into a state of being in contact with each other, and can switch the first electrical circuit from the disconnection state to the conduction state.

Also, the switching device 10A according to the modification can have effects similar to those of the switching device 10 described above. That is, the first electrical circuit is switched from the disconnection state to the conduction state by pyroelectric drive, and therefore, it is possible to shorten the time required for switching as compared with the known electromagnetic relay. This can quickly protect the equipment in which the switching device 10 is installed and avoid failure. Since the casing 5 is expansively deformed to bring the first electrical circuit into a conduction state, it is possible to further shorten the time for switching the first electrical circuit and downsize the switching device 10. Note that in the switching device 10A according to the modification, the first tubular portion 51 is widened and deformed, but, also in the aspect in which the energy (pressure) of the combustion gas directly acts on the casing as in the modification, the portion deformed in the casing is not limited to the first tubular portion 51 (tubular conductor portion). The technology of the present disclosure deforms, by the energy of the combustion gas, the casing in a manner that it expands to the outside of the discharge chamber.

Second Embodiment

Figure 8:
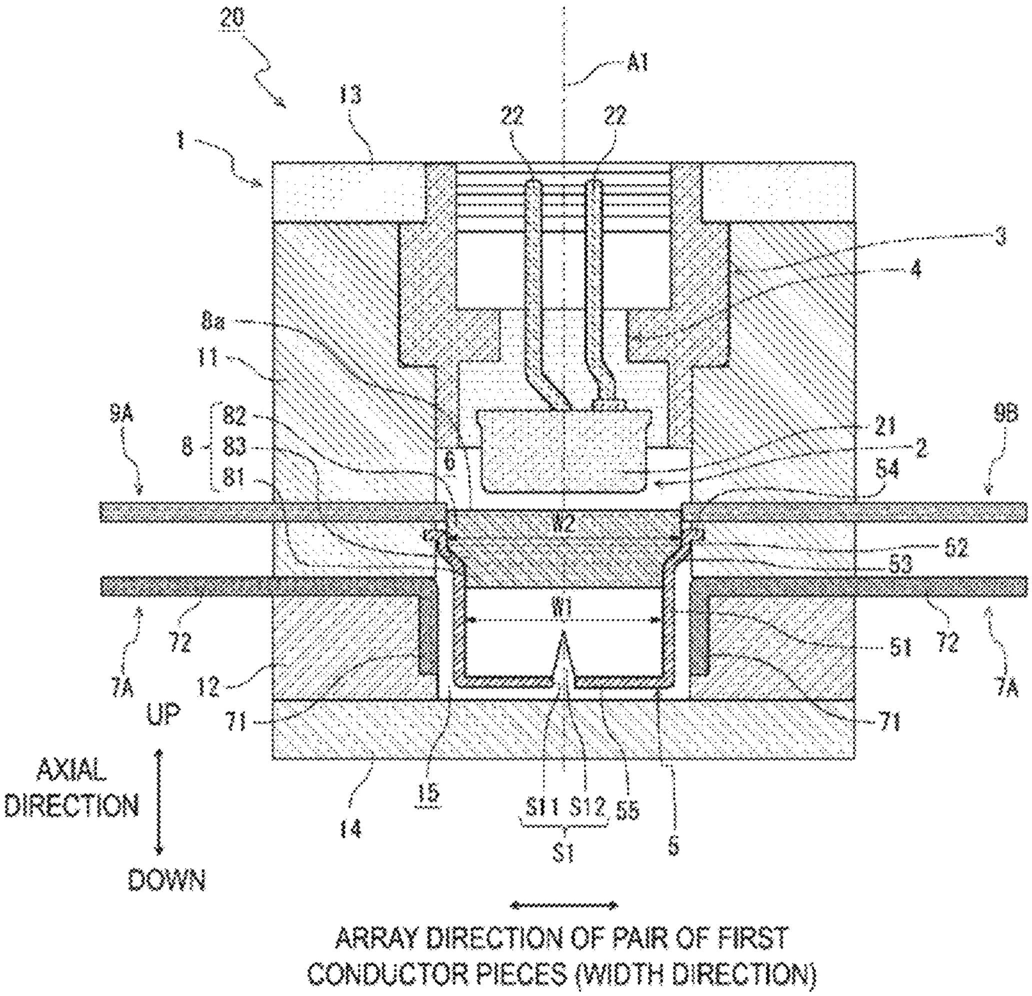
FIG. 8 is a longitudinal cross-sectional view for explaining a state before actuation of a switching device according to a second embodiment.
Figure 9:
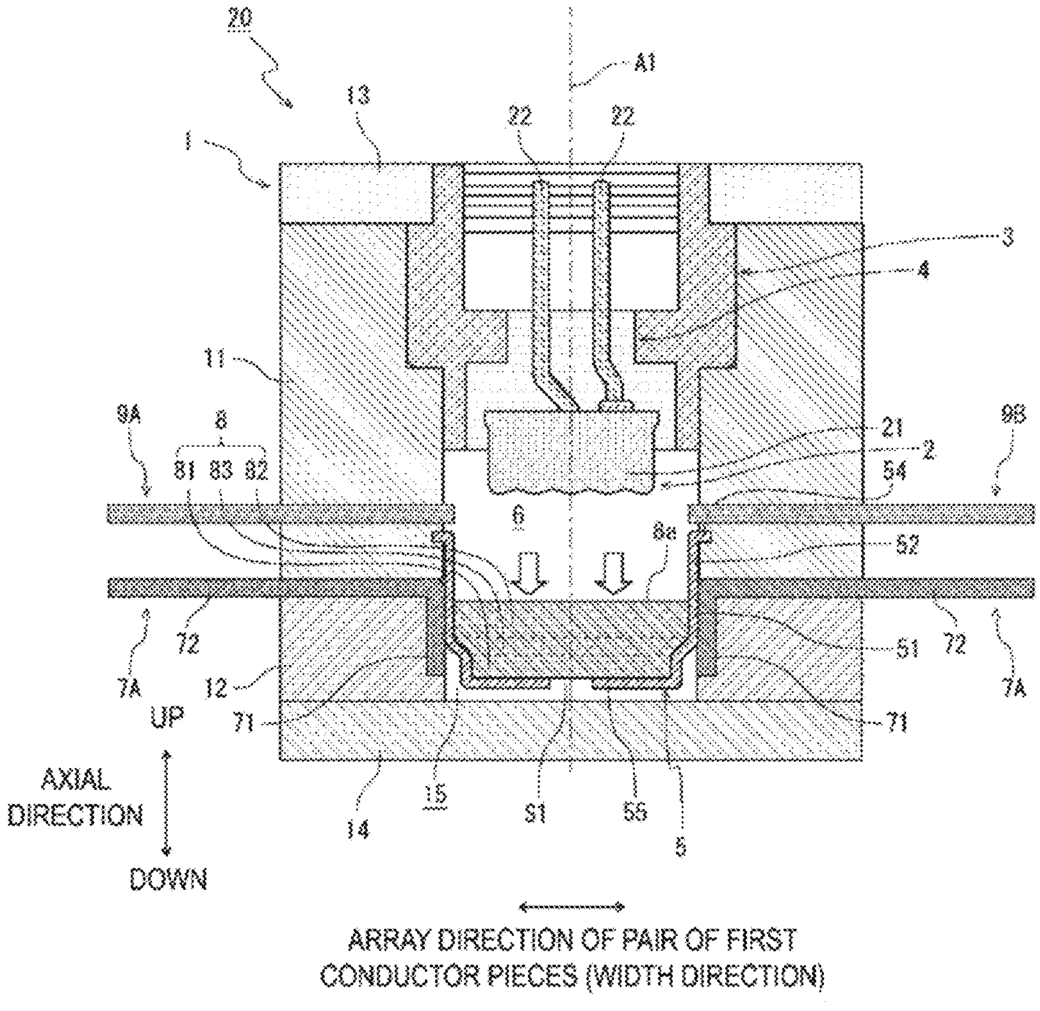
FIG. 9 is a longitudinal cross-sectional view for explaining an actuation status of the switching device according to the second embodiment.

Next, a switching device 20 according to the second embodiment will be described. In the description of the switching device 20, differences from the switching device 10 will be mainly described, and points similar to those of the switching device 10 will be denoted by identical reference signs, and detailed description thereof will be omitted. FIG. 8 is a longitudinal cross-sectional view for explaining a state before actuation of the switching device 20 according to the second embodiment. FIG. 9 is a longitudinal cross-sectional view for explaining an actuation status of the switching device 20 according to the second embodiment. As illustrated in FIGS. 8 and 9, the switching device 20 according to the second embodiment is different from the switching device 10 according to the first embodiment in further including a pair of second conductor pieces indicated by reference signs 9A and 9B.

The pair of second conductor pieces 9A and 9B are conductive metal bodies constituting a part of the constituent elements of the switching device 20 and each forming a part of a predetermined second electrical circuit in electrical equipment when the switching device 20 is installed in the electrical equipment that is an installation target. The second electrical circuit is formed of the pair of second conductor pieces 9A and 9B and a circuit component included in the electrical equipment.

The switching device 20 according to the second embodiment protects the electrical equipment by urgently switching the second electrical circuit from the conduction state to the disconnection state and urgently switching the first electrical circuit from the disconnection state to the conduction state when an abnormality occurs in the electrical equipment that is an installation target.

The configuration and application of the second electrical circuit in the present disclosure are not particularly limited. The second electrical circuit may be a circuit that is a protection target in the electrical equipment that is a target in which the switching device 20 is installed, for example. For example, the target in which the switching device 20 is installed is an automobile, and the second electrical circuit may be a circuit for supplying electric power from a battery of the automobile to an external component. The switching device 20 according to the second embodiment may, for example, when a unit for controlling a battery fails, switch the second electrical circuit from the conduction state to the disconnection state to cut off power supply from the battery to the outside, thereby suppressing a failure of an external component due to an overcurrent, and switch the first electrical circuit from the disconnection state to the conduction state to release charge accumulated in the second electrical circuit from the first electrical circuit, thereby protecting the second electrical circuit.

As illustrated in FIGS. 8 and 9, the pair of second conductor pieces 9A and 9B are arranged in a state of being separated from each other. The pair of second conductor pieces 9A and 9B are arranged on the near side (i.e., the upper side) relative to the pair of first conductor pieces 7A and 7B in the moving direction of the projectile 8. Each of the pair of second conductor pieces 9A and 9B extends in a direction orthogonal to the moving direction of the projectile 8 (i.e., the width direction of the first tubular portion 51), and has one end disposed in the accommodation portion 15 and the other end protruding to the outside of the housing 1. Another conductor (e.g., a lead wire) is connected in the second electrical circuit to a portion protruding to the outside of the housing 1 in each of the pair of second conductor pieces 9A and 9B. Note that in the example illustrated in FIGS. 8 and 9, the pair of second conductor pieces 9A and 9B are arranged along the array direction of the pair of first conductor pieces 7A and 7B, but the technology of the present disclosure is not limited to this. The array direction of the pair of second conductor pieces need not coincide with the array direction of the pair of first conductor pieces.

Similarly to the pair of first conductor pieces 7A and 7B, the pair of second conductor pieces 9A and 9B can be formed of a metal such as copper (Cu), for example. However, the pair of second conductor pieces 9A and 9B may be formed of a metal other than copper, or may be formed of an alloy of copper and another metal.

As illustrated in FIG. 8, in the pre-actuation initial state (more particularly, before actuation of the igniter 2), the projectile 8 is in a state of being sandwiched between the pair of second conductor pieces 9A and 9B. At this time, the projectile 8 and each of the pair of second conductor pieces 9A and 9B are in contact with each other. Here, the projectile 8 according to the second embodiment has conductivity, and is formed of a metal such as copper (Cu), for example. Therefore, before actuation of the igniter 2, the pair of second conductor pieces 9A and 9B are electrically connected via the projectile 8 by the projectile 8 having conductivity and each of the pair of second conductor pieces 9A and 9B being in contact with each other. Due to this, in the switching device 20, the second electrical circuit is in a conduction state before actuation of the igniter 2. Before actuation of the igniter 2, a part of the second electrical circuit is formed by the projectile 8.

As illustrated in FIG. 9, when the igniter 2 is actuated, the projectile 8 receives, on the pressure receiving surface 8*a*, the pressure (energy) of the combustion gas generated by the actuation of the igniter 2. Due to this, the pressure of the combustion gas is converted into a propulsive force, and the projectile 8 is pushed downward vigorously. The projectile 8 is moved by the pressure of the combustion gas to bring the projectile 8 and each of the pair of second conductor pieces 9A and 9B into a non-contact state with each other, whereby electrical connection between the pair of second conductor pieces 9A and 9B via the projectile 8 is disconnected as illustrated in FIG. 9. This brings the second electrical circuit into a disconnection state. Then, as in the first embodiment, the projectile 8 moves downward along the first tubular portion 51 while pushing and widening the first tubular portion 51, whereby the first tubular portion 51 is widened and deformed and the first tubular portion 51 of the casing 5 and the contact piece 71 of each of the pair of first conductor pieces 7A and 7B are brought into a state of being in contact with each other. This brings the first electrical circuit into a conduction state.

As described above, using the energy of the combustion gas generated by actuation of the igniter 2, the switching device 20 according to the second embodiment urgently switches the second electrical circuit from the conduction state to the disconnection state, and urgently switches the first electrical circuit from the disconnection state to the conduction state. That is, the switching device 20 can switch the electrical circuit to be brought into the conduction state from the second electrical circuit to the first electrical circuit by pyroelectric drive. Since the switching device of the second embodiment performs switching from the first electrical circuit to the second electrical circuit by the pyroelectric drive, the time required for the switching can be shortened as compared with the known electromagnetic relay. This can quickly protect the electrical equipment in which the switching device 20 is installed and avoid failure. By adopting the configuration in which the pair of second conductor pieces 9A and 9B are electrically connected by the projectile 8, the switching device 20 according to the second embodiment can achieve, by one actuation of the igniter 2, switching of the second electrical circuit from the conduction state to the disconnection state and switching of the first electrical circuit from the disconnection state to the conduction state.

Note that in the switching device 20 according to the second embodiment, the projectile 8 and each of the pair of second conductor pieces 9A and 9B are formed as separate members, but the technology of the present disclosure is not limited to this. For example, the projectile and each of the pair of second conductor pieces may be formed as an integral member (one member). In a state before actuation of the igniter, the projectile and each of the pair of second conductor pieces may be one member, and when the igniter is actuated, the projectile may be separated and moved from the member by the pressure of the combustion gas, whereby connection of the pair of second conductor pieces via the projectile may be disconnected.

While the embodiments of the electric circuit switching device according to the present disclosure have been described above, each of the aspects disclosed in the present specification can be combined with any other feature disclosed in the present specification.

REFERENCE SIGNS LIST

10, 10A, 20: Electrical circuit switching device
1: Housing
2: Igniter
5: Casing
51: First tubular portion (example of tubular conductor portion)
6: Discharge chamber
7A, 7B: Pair of first conductor pieces
8: Projectile
9A, 9B: Pair of second conductor pieces

The invention claimed is:

1. An electrical circuit switching device for switching a predetermined first electrical circuit from a disconnection state to a conduction state, the electrical circuit switching device comprising: a housing; an igniter provided in the housing; a discharge chamber in which a combustion gas from the igniter is discharged when the igniter is actuated; a casing having conductivity and defining at least a part of the discharge chamber; and a pair of first conductor pieces arranged outside the discharge chamber in a state of being separated from each other, each of the pair of first conductor pieces forming a part of the first electrical circuit, wherein before actuation of the igniter, at least one of the pair of first conductor pieces and the casing are in a non-contact state with each other and thus the first electrical circuit is in a disconnection state, and when the igniter is actuated, the casing is deformed and thus expands to an outside of the discharge chamber by energy of a combustion gas generated by actuation of the igniter, the casing and each of the pair of first conductor pieces are brought into a state of being in contact with each other, and thus the first electrical circuit is brought into a conduction state; wherein the casing includes a tubular conductor portion formed in a tubular shape, the pair of first conductor pieces are disposed outside the tubular conductor portion in a manner that each of the pair of first conductor pieces faces an outer circumferential surface of the tubular conductor portion, and when the igniter is actuated, the tubular conductor portion is deformed and thus widened by energy generated by actuation of the igniter, and thus the tubular conductor portion and each of the pair of first conductor pieces are brought into a state of being in contact with each other.

2. The electrical circuit switching device according to claim 1 further comprising:

a projectile disposed between the igniter in the discharge chamber and the tubular conductor portion in a manner that the projectile receives a pressure of a combustion gas discharged from the igniter, wherein when the igniter is actuated, the projectile moves along the tubular conductor portion while pushing and widening the tubular conductor portion by pressure of the combustion gas, and thus the tubular conductor portion and each of the pair of first conductor pieces are brought into a state of being in contact with each other.

3. The electrical circuit switching device according to claim 2, wherein the pair of first conductor pieces are disposed in a manner that the pair of first conductor pieces are positioned on opposite sides to each other across the tubular conductor portion, and a width of the projectile is larger than a width of an inner region of the tubular conductor portion in an array direction of the pair of first conductor pieces.

4. The electrical circuit switching device according to claim 2, wherein the casing further includes a lid wall portion closing an end part on a destination side of the projectile of both end parts of the tubular conductor portion, and the projectile moving along the tubular conductor portion when the igniter is actuated is received by the lid wall portion, and thus a state in which the tubular conductor portion is pushed and widened is maintained.

5. The electrical circuit switching device according to claim 4, wherein the pair of first conductor pieces are disposed in a manner that the pair of first conductor pieces are positioned on opposite sides to each other across the tubular conductor portion, a slit is formed in the casing, and the slit includes a first region extending in a direction orthogonal to an array direction of the pair of first conductor pieces over an entirety of the lid wall portion, and a second region extending along the tubular conductor portion from both ends of the first region.

6. The electrical circuit switching device according to claim 2 further comprising:

a pair of second conductor pieces arranged in a state of being separated from each other, each of the pair of second conductor pieces forming a part of a predetermined second electrical circuit, wherein the projectile has conductivity, before actuation of the igniter, the pair of second conductor pieces are electrically connected via the projectile and thus the second electrical circuit is in a conduction state, and when the igniter is actuated, the projectile is moved by a pressure of the combustion gas, and electrical connection between the pair of second conductor pieces via the projectile is disconnected, and thus the second electrical circuit is brought into a disconnection state.

7. The electrical circuit switching device according to claim 1, wherein the casing is disposed in a manner that the casing receives a pressure of a combustion gas discharged from the igniter, and when the igniter is actuated, the casing is deformed and thus expands to an outside of the discharge chamber by the pressure of the combustion gas, and thus the casing and each of the pair of first conductor pieces are brought into a state of being in contact with each other.

8. The electrical circuit switching device according to claim 1, wherein the casing is made of a metal.

9. The electrical circuit switching device according to claim 3, wherein the casing further includes a lid wall portion closing an end part on a destination side of the projectile of both end parts of the tubular conductor portion, and the projectile moving along the tubular conductor portion when the igniter is actuated is received by the lid wall portion, and thus a state in which the tubular conductor portion is pushed and widened is maintained.

10. The electrical circuit switching device according to claim 3 further comprising:

a pair of second conductor pieces arranged in a state of being separated from each other, each of the pair of second conductor pieces forming a part of a predetermined second electrical circuit, wherein the projectile has conductivity, before actuation of the igniter, the pair of second conductor pieces are electrically connected via the projectile and thus the second electrical circuit is in a conduction state, and when the igniter is actuated, the projectile is moved by a pressure of the combustion gas, and electrical connection between the pair of second conductor pieces via the projectile is disconnected, and thus the second electrical circuit is brought into a disconnection state.

11. The electrical circuit switching device according to claim 4 further comprising:

a pair of second conductor pieces arranged in a state of being separated from each other, each of the pair of second conductor pieces forming a part of a predetermined second electrical circuit, wherein the projectile has conductivity, before actuation of the igniter, the pair of second conductor pieces are electrically connected via the projectile and thus the second electrical circuit is in a conduction state, and when the igniter is actuated, the projectile is moved by a pressure of the combustion gas, and electrical connection between the pair of second conductor pieces via the projectile is disconnected, and thus the second electrical circuit is brought into a disconnection state.

12. The electrical circuit switching device according to claim 5 further comprising:

a pair of second conductor pieces arranged in a state of being separated from each other, each of the pair of second conductor pieces forming a part of a predetermined second electrical circuit, wherein the projectile has conductivity, before actuation of the igniter, the pair of second conductor pieces are electrically connected via the projectile and thus the second electrical circuit is in a conduction state, and when the igniter is actuated, the projectile is moved by a pressure of the combustion gas, and electrical connection between the pair of second conductor pieces via the projectile is disconnected, and thus the second electrical circuit is brought into a disconnection state.

13. The electrical circuit switching device according to claim 1, wherein the casing is disposed in a manner that the casing receives a pressure of a combustion gas discharged from the igniter, and when the igniter is actuated, the casing is deformed and thus expands to an outside of the discharge chamber by the pressure of the combustion gas, and thus the casing and each of the pair of first conductor pieces are brought into a state of being in contact with each other.

* * * * *